(12) United States Patent
Kammerzell et al.

(10) Patent No.: US 10,382,654 B2
(45) Date of Patent: Aug. 13, 2019

(54) PRINTING BACKGROUND PRINT AGENTS

(71) Applicant: Hewlett-Packard Development Company, L.P., Houston, TX (US)

(72) Inventors: Barret Kammerzell, Barcelona (ES); Josep-Maria Serra, San Diego, CA (US); Pablo Vidal Alvarez, Sant Cugat del Valles (ES); Utpal Kumar Sarkar, Sant Quirze del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/763,789

(22) PCT Filed: Jan. 29, 2016

(86) PCT No.: PCT/US2016/015574
§ 371 (c)(1),
(2) Date: Mar. 27, 2018

(87) PCT Pub. No.: WO2017/131732
PCT Pub. Date: Aug. 3, 2017

(65) Prior Publication Data
US 2018/0241912 A1    Aug. 23, 2018

(51) Int. Cl.
*H04N 1/60* (2006.01)
*G06K 15/02* (2006.01)
*B41J 2/01* (2006.01)
*G06F 3/12* (2006.01)

(52) U.S. Cl.
CPC .............. *H04N 1/6005* (2013.01); *B41J 2/01* (2013.01); *G06F 3/1208* (2013.01); *G06F 3/1253* (2013.01); *G06K 15/189* (2013.01); *G06K 15/1868* (2013.01); *G06K 15/1878* (2013.01);
(Continued)

(58) Field of Classification Search
None
See application file for complete search history.

(56) References Cited

U.S. PATENT DOCUMENTS

| | | |
|---|---|---|
| 8,498,018 B2 | 7/2013 | Doggett et al. |
| 8,784,508 B2 | 7/2014 | Ellis |
| 9,079,420 B2 | 7/2015 | Tsuji |

(Continued)

OTHER PUBLICATIONS

Oce Arizona Series UV flatbed printers, Jul. 2014. <https://csa.canon.com/online/wcm/connect/csa/8f06cb26-5aae-4026-b5f9-8fb4d495c931/Arizona_Tech_Backgrounder.7.14.W.pdf?MOD=AJPERES >.

*Primary Examiner* — Lennin R RodriguezGonzalez
(74) *Attorney, Agent, or Firm* — HP Inc. Patent Department (57) ABSTRACT

In an example, a method includes receiving print data indicative of an image to be printed on a substrate. The print data may indicate an image portion in which an image is present and a void portion in which the image is absent. An amount of background print agent to be applied to a region of the substrate corresponding to the locations of the image portion and the void portion on the substrate when the image is printed may be determined. In examples, the amount of background print agent determined to be applied to a region of the substrate corresponding to the location of the void portion on the substrate when the image is printed is greater than the amount of a background print agent to be applied to the region of the substrate corresponding to the location of the image portion on the substrate when the image is printed.

15 Claims, 4 Drawing Sheets

(52) U.S. Cl.
CPC ......... *H04N 1/6022* (2013.01); *H04N 1/6094* (2013.01)

(56) References Cited

U.S. PATENT DOCUMENTS

| | | |
|---|---|---|
| 2009/0033956 A1 | 2/2009 | Tamagawa |
| 2011/0109673 A1 | 5/2011 | Usuda et al. |
| 2012/0056922 A1 | 3/2012 | Yoshida |
| 2013/0135383 A1 | 5/2013 | Sano |
| 2013/0278660 A1 | 10/2013 | Tsuji |
| 2015/0029518 A1 | 1/2015 | Tashiro et al. |
| 2015/0093553 A1 | 4/2015 | Tyagi et al. |

PRINTING BACKGROUND PRINT AGENTS

BACKGROUND

When printing print agent such as an ink onto a substrate to form an image, various image parameters may be considered. In some examples, these may include the appearance of a background region or the appearance of the colors in the image. In some circumstances a background layer of print agent is applied above or below the print agent used to form an image.

BRIEF DESCRIPTION OF DRAWINGS

Examples will now be described with reference to the accompanying drawings, in which.

DETAILED DESCRIPTION

Figure 1:
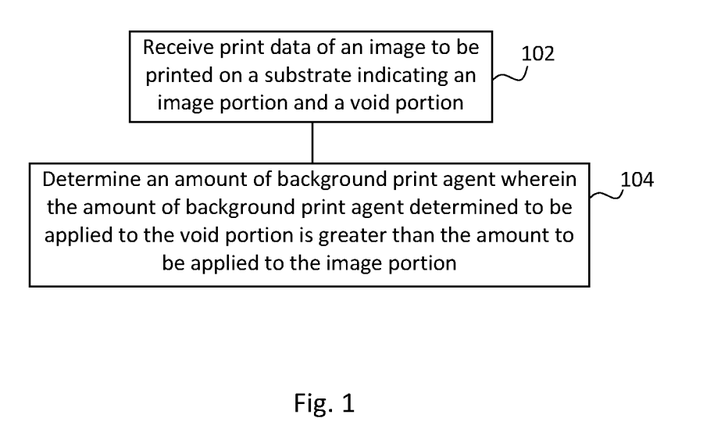
FIG. 1 is a flow chart showing an example method of determining an amount of background print agent to print.

FIG. 1 shows an example method, which may for example by implemented by at least one computing device, of determining an amount of background print agent to print comprising, in block 102, receiving print data indicative of an image to be printed on a substrate, the print data indicating an image portion in which an image is present and a void portion in which the image is absent. A void portion, as the term is used herein, is any portion in which the image is absent. Examples of void portions may include border regions around an image, or areas within the bounds of the image (e.g. gaps) where the print data does not specify that print agent is to be applied. An image portion, as the term is used herein, is any part of the print data that specifies a region where print agent is to be printed as part of the image.

The image data may indicate a void portion as an absence of image data in at least one region. Each of the image and the void portions may comprise a plurality of sub-portions, which may be contiguous or separate. The locations of the image portion and/or the background portion may be determined from the image data.

In block 104, an amount of background print agent to be applied to a region of the substrate corresponding to the locations of the image portion and the void portion on the substrate when the image is printed is determined. In this example, the amount of background print agent determined to be applied to a region of the substrate corresponding to the void portion when the image is printed is greater than the amount of a background print agent to be applied in the location in which the image portion is (or is to be) printed.

In some examples, the substrate is a fibrous sheet-like material such as paper, fabric or a synthetic material such as a plastic sheet, which may be a transparent plastic sheet (which may be termed a transparency). In some examples, the substrate may be colored or off-white. In some examples, the substrate may be textured, the texture causing the substrate to appear to have fine grain color variations.

In some examples, a background print agent may be a suspension of particles in liquid, such as an ink or electrostatic ink such as a wet toner. In other examples, it may be an electrostatic particulate, such as a dry toner that may be printed onto the substrate. In some examples, the background print agent may be a colored, black or white print agent. The method may further comprise applying background print agent to the substrate.

In some examples, the print data may comprise data specifying the at least one location of a substrate in which print agents should be printed to the substrate in order to form the image. The print data may be in the form of at least one grid of values corresponding to colors of the pixels in the image. In some examples, the print data may be in the form of a set of position vectors that specify the coordinates of each region and color vectors that specify the colors of each region. In some examples, the color vectors may be Red-Green-Blue (RGB) vectors. The absence of print data or color values associated with a particular pixel may indicate that that pixel will comprise part of a void portion.

In some examples, determining an amount of background print agent to be applied to a region of the substrate corresponding to the locations of the image portion and the void portion on the substrate when the image is printed comprises determining an amount of background print agent to be applied to a region of the substrate corresponding to at least substantially the entire region over which the image is to be printed, or over substantial region (in some examples substantially the entire addressable region) of the substrate. The addressable region may be the area to which a printer (for example, a particular printer, or a class of printer) can apply a print agent. When the background print agent is applied to this region, this background layer may be referred to herein as the 'background'.

The image portions may be printed onto the substrate using image print agents. In some examples, an image print agent may be a suspension of particles in liquid, such as an ink or electrostatic ink such as a wet toner. In other examples, it may be an electrostatic particulate, such as a dry toner that may be printed onto the substrate. In some examples, image print agents may comprise a white, colored or black print agent. The image print agent may comprise the same substance as (or a substance in common with) the background print agent. For example, the background print agent may be a white ink. If there are white portions in the image, these may be printed using the same white ink. Therefore, the terms 'background print agent' and 'image print agent' are intended to refer to the purpose of the print agent, for example whether the location of the placement of the agent is specified in image data (as may be the case for image print agent) or not, rather than implying any particular distinction in the physical form of the print agents.

In some examples, the background print agent is to be applied above or below the image on the substrate. For example, when printing a colored image on paper, a layer of white background print agent may be applied to the paper before the colored image is printed over the top. In this way, the white background lies below the colored image and provides an even tone to the finished printed product, and for example preventing background regions from appearing 'grey' (or some other color) in regions where the paper shows through. In another example, a colored image may be printed to a transparency and a background layer of print agent may be applied over the top of the colored image. In this way, the background print agent provides a uniform background opacity when the image is viewed through the transparency.

When a layer of print agent is applied above or below an image in this way, it may be referred to as a 'flood'. In some examples, an under-flood mode of printing is contemplated whereby a layer of background print agent is formed on the substrate followed by a layer of image print agent to form the image. In other examples, an over-flood mode of printing is contemplated whereby the image print agent is first applied to the substrate followed by a layer of background print agent. In some examples, the flood is applied as a 'sandwich' layer between image layers (for example to provide images which are visible on both sides of a transparency).

Two parameters which may be considered are the color density of the background and the vividness or quality of the colors that are printed above or below the background.

It has been proposed that that background is printed as a uniform layer (i.e. uniform flooding) on the substrate. The depth or amount of background in such a case may be chosen in view of the color density of the background or in view of the quality of the colors in the image. However, good image quality in image portions can often be achieved with less underlying background print agent than is necessary to achieve good background color density in void portions, particularly if the background is white. Therefore, selecting the amount of the background print agent to obtain a predetermined background depth may lead to excess background print agent in image portions. This can result in thicker layers of background and image print agent in the image areas resulting in increased curing or drying time (and thus reduced print speed) or increased curing or drying temperature. This can restrict printer design to larger curing modules, slower print speeds or higher temperatures (which isn't always possible for all substrates). Conversely, selecting the amount of background print agent based on a predetermined image parameter for image regions can lead to sub-optimal void color density. In the case that the background print agent is white, this may lead to the void portions between or around image portions being perceived as "greyish".

The method shown in FIG. 1 addresses this by determining to apply a background whereby more print agent is applied to region(s) of the substrate corresponding to void portions (i.e. in background regions of the image where no image is present) than is applied in locations corresponding to image portions. This allows the amount of background print agent to be tailored in both image and void portions, for example ensuring that sufficient agent is applied to void portions whilst ensuring that application of print agent applied under image portions is not excessive. Void and image portions may be readily distinguished and therefore the method need not introduce undue processing overhead.

In some examples, such a method (or print instructions produced as a result of employing the method) may be employed by a scanning printer (i.e. a print head makes printing passes relative to a substrate), or by a non-scanning printer (for example comprising a page wide array of nozzles which apply print agent to a substrate), or by some other form of printer.

In one example, the amount of print agent to be applied to region(s) of the substrate corresponding to a void portion is determined in order to provide a predetermined color parameter such as whiteness and the amount of print agent to be applied to region(s) of the substrate corresponding to an image portion is determined in order to provide a predetermined image parameter, which may be an image appearance parameter associated with the appearance of the image portion, for example the color density or color vividness of the printed image portion. In some examples, two amounts of print agent are determined, one to be used in regions of the substrate corresponding to void portions, and one to be used in regions of the substrate corresponding to image portions. In some examples, the amount of background agent to be used in regions of the substrate corresponding to image portions may be varied over the region, for example as a function of ink density in the image portion. In other examples, the amount of background agent to be used in regions of the substrate corresponding to each of the void and image portions is consistent throughout those portions.

Figure 2:
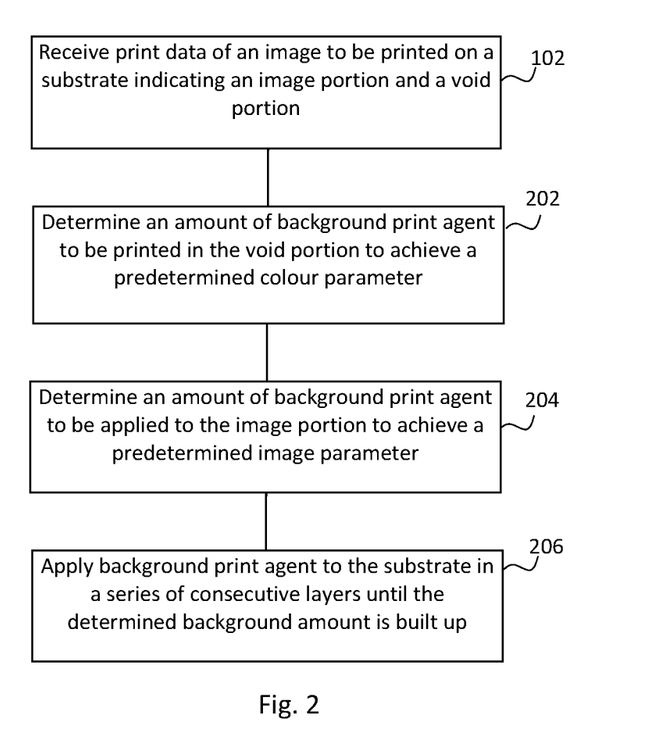
FIG. 2 is a flow chart showing an another example method of determining an amount of background print agent to print.

FIG. 2 shows, in blocks 202 and 204, an example of carrying out the method of block 104. Block 102 may be carried out as described above. In block 202, an amount of background print agent to be printed in region(s) of the substrate corresponding to the void portion in order to achieve a predetermined color parameter is determined. In examples where the background is white, the color density (for example, "whiteness") of the background may for example be given by a lightness parameter $L^*$ (which is indicative of Lightness in an $L^*a^*b$ color space). For example a predetermined color parameter with respect to lightness may be a value of $L^*$ of at least a threshold value, for example at least around 88, 90 or 94.

Block 206 comprises determining an amount of background print agent to be applied to a region of the substrate corresponding to the image portion to achieve a predetermined image parameter of the image portion when printed. This image parameter may for example comprise any appearance parameter, for example a color parameter, such as a color density of the image print agent, or be selected to provide some image brightness or "vividness" of color, a certain finish to the image or a particular opacity of the image if the substrate is a transparency. The image parameter and the color parameter may be different parameters. For example, the color parameter of the void portions may be a lightness parameter whereas the image parameter may be a vividness parameter, which may for example be specified in terms of a threshold gamut volume, color range of the image, colorfulness of the image, chroma of the image, or the like.

In this example, the method further comprises applying background print agent to the substrate in a series of consecutive layers until the determined background amount is built up (block 206).

In some examples, a background flood may be built up in a series of layers. It may be proposed to provide a series of a number of layers, for example, ten layers, formed over ten consecutive passes of the print head over the substrate with a background color. In this context, a 'pass over the substrate' refers to the print head being moved relative to the substrate, from one side of the substrate to the other (although in other examples a 'pass' could comprise, for example, passing the substrate past a page-wide array). As the print head makes a pass over the substrate, print agent may be deposited onto the surface of the substrate. There may also be passes of the print apparatus over the substrate in order to allow the applied background print agent (or, the case of an over-flood, image print agent) to dry. In some examples, this may be carried out once the background layers or the image layers have been applied. In some examples, a drying/curing action (for example, the application of heat) may be carried out in both printing passes and in non-printing passes. For example, at least one non-printing pass may comprise drying or curing the applied background/image layers without applying additional print agent and may therefore comprise drying or curing passes. Drying or curing passes may be carried out between layers types (i.e. between image print agent layers and background print agent layers), and/or for example between passes in which background print agent is applied and passes in which image print agent is applied.

In the case of under-flooding, once the background is dried, in further passes, layers of image print agent may be applied corresponding to the image portions. In the case of over-flooding, this order may be reversed. In some examples, the flood is applied as a 'sandwich' layer between image layers (for example to provide an image which is visible on both sides of a transparency). In this way, a final image is built up.

In some examples, applying background print agent to the substrate in block 206 may comprise applying no background print agent to a region of the substrate corresponding to the image portion, and some background print agent to a region of substrate corresponding to the void portion.

In some examples, applying background print agent to the substrate in block 206 may comprise applying thinner layers of background print agent to a region of the substrate corresponding to the image portion than to a region of substrate corresponding to the void portion.

Figure 3A:
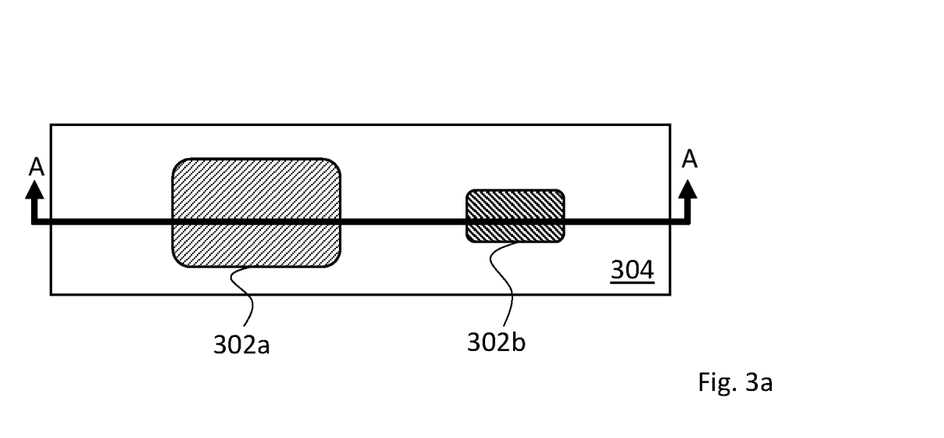
FIGS. 3a, 3b and 3c show an example of applying print agent to a substrate.
Figure 3B:
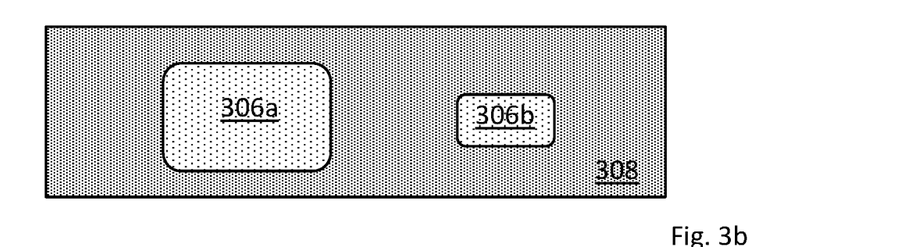

This is illustrated in FIG. 3 which shows three schematics of an example printing process used to print the image shown in FIG. 3a. FIG. 3a comprises image portions 302a and 302b of colored print agent and a void portion 304. FIG. 3b shows an example of a non-uniform background layer (flood) of print agent that is applied below the image portions 302a and 302b. The background comprises two image portions 306a and 306b where the amount of background print agent is reduced (i.e. a thinner layer) compared to the surrounding void portion 308. The amounts of print agent in the image and void portions are determined in order to provide a predetermined whiteness of the void portions 304 in the final image and a predetermined vividness or quality of the colors in the image portions 302a and 302b in the final image. In this way, high quality background and high quality colors are produced, whilst reducing the total amount of background print agent used, thus reducing print costs. Furthermore, the peak print agent density is reduced in the image portions (as less background print agent is applied a region of the substrate corresponding to the image portions). The peak print agent density of a print is a determining factor when curing the print and a reduction in the peak print agent density thus reduces the curing time and/or temperature to set the print agents.

Figure 3C:
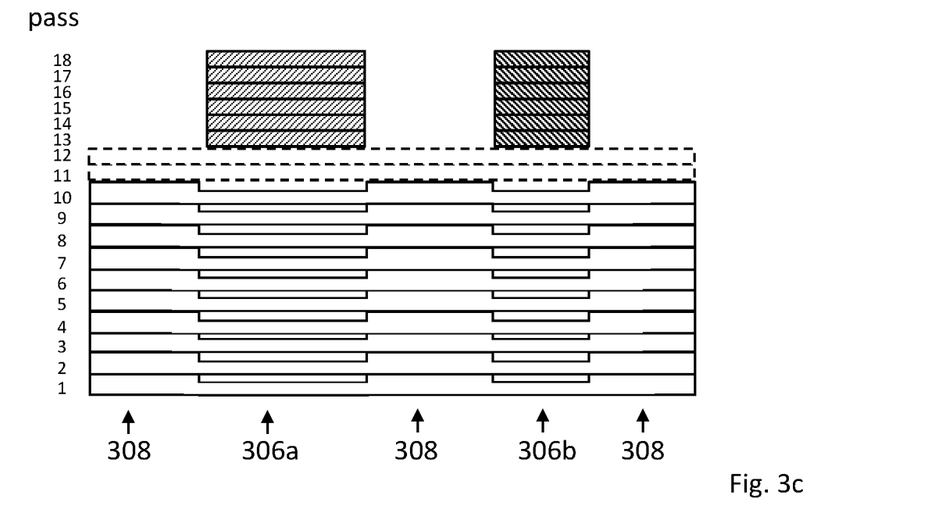

The background shown in FIG. 3b may be built up in a series of consecutive layers, as shown in FIG. 3c which shows the sequence of layers of a strip along the line A-A'. Each row in FIG. 3c represents a single pass of the printer across the line A-A'. In passes 1-10, the printer varies the amount of background print agent that is applied to the substrate, so that more print agent is applied to areas along the line that correspond to void portions 308 than is applied to areas corresponding to image portions 306a and 306b. In this way a thinner layer of background print agent is applied to the regions of a substrate corresponding to the image portions. Although in the example of the Figures, the layer is shown as physically thinner, this does not necessarily mean that less material is applied-in some example, the color density may be reduced, for example such that there are fewer colored particles in a suspension. In some examples, 'thinner' may mean that fewer drops of print agent are used per unit area.

In passes 11 and 12 over the substrate, drying passes apply heat and to dry and/or cure the background print agent layers. In passes 13-18, six layers of image print agent are applied to form the final image. Therefore, it may be noted that FIG. 3c does not represent a profile of print agent applied to the substrate. In particular, as thinner layers of ink may be applied in the regions of the substrate corresponding to the image portion, the total height of these layers after the $10^{th}$ pass may be lower than the height of the layers corresponding to the void regions. Instead, FIG. 3c may be considered to have a vertical 'time' axis.

In some examples, applying background print agent to the substrate in a series of consecutive layers in block 206 comprises applying fewer layers of background print agent to a region of the substrate corresponding to the image portion than to a region of the substrate corresponding to the void portion.

Figure 4A:
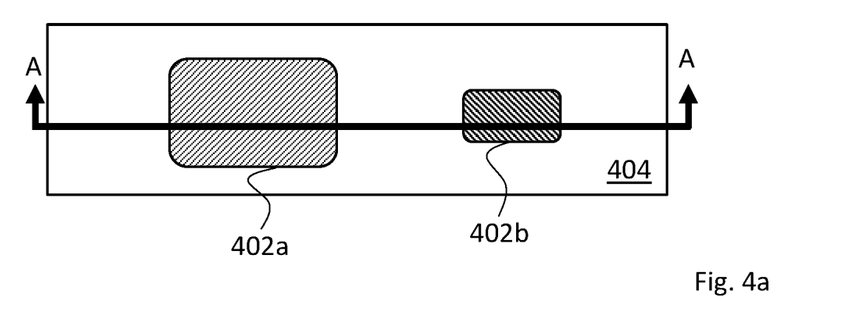
FIGS. 4a, 4b and 4c show another example of applying print agent to a substrate.
Figure 4B:
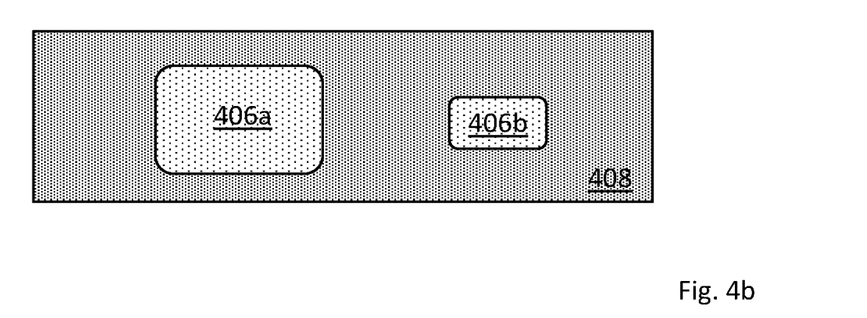

This is illustrated in FIG. 4 which shows three schematics of an example printing process used to print the image shown in FIG. 4a. FIG. 4a comprises image portions 402a and 402b of colored print agent and a void portion 404. FIG. 4b shows an example of a non-uniform background layer (flood) of print agent that can be applied below the image portions 402a and 402b. The background comprises two image portions 406a and 406b where the amount of background print agent is reduced (i.e. fewer layers) compared to the surrounding void portion 408. As described in the example in FIG. 3, the amounts of print agent in the image and void portions may be determined in order to optimise parameters such as, for example, the color density (e.g. whiteness) of the void portions 404 and/or the color density, vividness or quality of the colors in the image portions 402a and 402b.

Figure 4C:
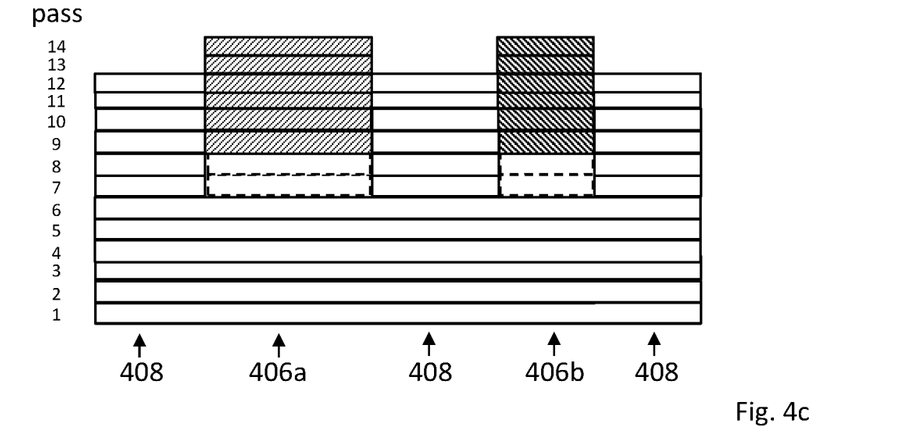

FIG. 4c illustrates a sequence of consecutive layers of printed print agent that can be applied to the substrate in a stripe along the line A-A' in order to build up the void and image portions shown along A-A' in FIG. 4a. In this example, white background print agent is applied to regions of the substrate corresponding to the void portions 408 in passes 1-10, but is just applied in passes 1-6 in the regions of the substrate corresponding to the image portions 406a, 406b. As described above, fewer layers of print agent are applied in the regions of the substrate corresponding to the image portions compared to the void portions, saving print agent when compared to the use of a uniform flood.

The method may comprise applying a first layer of background print agent substantially uniformly across the region of the substrate corresponding to both the image portion and the void portion and applying a second layer of print agent over the first layer, wherein the second layer comprises background print agent in a region of the substrate corresponding to the void portion and image print agent in a region of the substrate corresponding to the image portion. The first and second layer may be applied in either order. For example, in an under-flood print operation, the first layer may be applied before the second layer, whereas in an over-flood operation, the second layer may be applied before the first layer.

This can be seen in FIG. 4c, where the first 6 passes comprise background print agent, and passes 9 and 10 comprise background print agent in void portions 408 and image print agent in image portions 406a, 406b.

When, in passes 9 and 10 both background print agent and image print agent are printed as the printer moves from A to A' in a single pass, in the designated regions shown in FIG. 4c, then the total number of passes of the printer over the substrate can be reduced compared to examples in which complete background layers are printed before any image layers, thus reducing the printing time. Therefore, in some examples, applying a second layer of print agent over the first layer comprises applying the background print agent and the image print agent in a single printing pass. Even with the same two passes of curing over the background layer in the image regions (represented by passes 7 and 8 in FIG. 4c), the color passes may be started sooner than if complete background layers were printed. This may result in the same reduction in peak print agent intensity and total print agent as was described with respect to FIG. 3, and additionally results in increased print speed.

In some examples, each printing pass comprises, in addition to applying a print agent, drying the print agent already applied, for example by providing a flow of heated air. In some examples, a non-printing or drying pass may be made to perform a drying or curing action without adding further print agent. The whole printed surface could be dried in passes 7 and 8, in this example, application of the background print agent in the void region is continues while the regions which are to be overprinted with image print agent are dried. This may reduce a risk of the image layer bleeding into the background layer, while speeding up the printing task as a whole. Passes 9 and 10 therefore comprise drying passes for regions corresponding to the image portions and printing passes for regions corresponding to the void portions.

In any of the examples provided above, the image print agent may comprise a colored, white or black print agent, or any combination of colored, black or white print agents. The background print agent may be any color, including black, white or colored print agents. As described above, the background print agent may cover the substrate in a flood. FIGS. 3 and 4 are examples of under-flooding but the principles described in relation to these figures may be applied to over-flooding and/or 'sandwich' floods.

Figure 5:
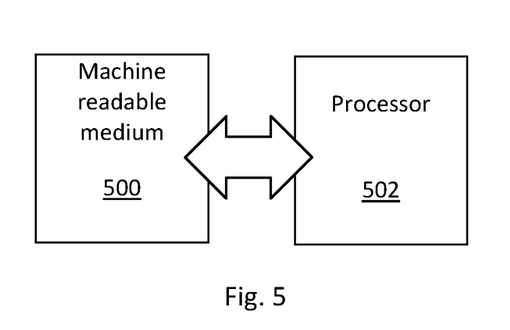
FIG. 5 is a schematic example of a machine readable medium associated with a processor.

FIG. 5 shows a non-transitory machine readable medium 500 in association with a processor 502. The non-transitory machine readable medium 500 stores instructions which, when executed by the processor 502, cause the processor 502 to receive print data indicative of an image to be printed on a substrate, the print data indicating an image portion in which an image is present and a void portion in which the image is absent. The non-transitory machine readable medium 500 also stores instructions which, when executed by the processor 502, cause the processor 502 to determine an amount of background print agent to be applied to a region of the substrate corresponding to the locations of the image portion and the void portion on the substrate when the image is printed. The amount of background print agent determined by the processor 502 to be applied to a region of the substrate corresponding to the void portion (when the image is printed) is greater than the amount of a background print agent to be applied to the image portion.

Figure 6:
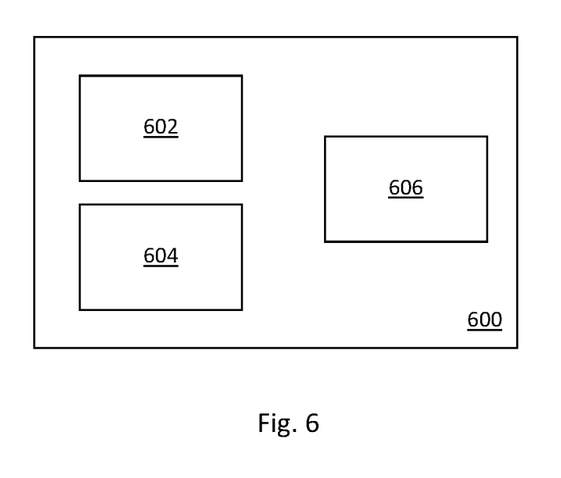
FIG. 6 is a simplified schematic of an example printer.

A further example shown in FIG. 6 shows a printer 600 comprising an interface 602 to receive print data, a print agent module 604 and a print head 606. The interface 602 receives print data indicative of an image to be printed on a substrate, the print data indicating an image portion in which an image is present and a void portion in which the image is absent. The print agent module 604 determines an amount of background print agent to be applied to a region of the substrate corresponding to the locations, when printed, of both the image portion and the void portion and the print head 606 comprises at least one reservoir of print agent to apply the determined amount of background print agent (and, in some examples, image print agent) to the substrate.

The amount of background print agent determined by print agent module 604 to be applied to a region of the substrate corresponding to the void portion is greater than the amount of a background print agent to be applied to the image portion. The print agent module 604 may for example be implemented as hardware, for example as a processor or the like. In some examples, the print agent module 604 may be remote from, but operative coupled to, the printer 600.

In some examples, the printer 600 may be a scanning printer (i.e. a print head makes printing passes relative to a substrate). In other examples, the printer 600 may be a non-scanning printer, for example comprising a page wide array of nozzles which apply print agent to a substrate.

In some examples, the print agent module 604 may determine an amount of background print agent to be applied to a region of the substrate corresponding to the location of the void portion on the substrate when the image is printed to provide a predetermined color parameter. In some examples, the print agent module 604 may also determine an amount of background print agent to be applied to a region of the substrate corresponding to the location of the image portion on the substrate (when printed) to provide a predetermined image parameter. In some examples, the predetermined color parameter is indicative of lightness and the predetermined image parameter is indicative of color vividness.

In some examples, the printer 600 may comprise drying apparatus to dry or cure print agent once it has been applied to a substrate. The regions of the substrate which are dried or cured may be selectively controlled, for example to correspond to an image region. In some examples, a printing pass may be carried out while the drying apparatus is operating. In some examples, a printing pass may address just one of the image and the (background agent bearing) void portions, to give the other of the image print agent and/or the background print agent additional exposure to the action of the drying apparatus. This may be carried out between layers in which, in the location or intended location of an image portion, there is a transition between printing using background print agent and printing using image print agent.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams (for example, the processor 502). In particular, a processor or processing apparatus may execute the machine readable instructions. Thus functional modules of the apparatus and devices (for example, the print agent module 604) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example, the machine readable medium 500) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving print data indicative of an image to be printed on a substrate, the print data indicating an image portion in which an image is present and a void portion in which the image is absent; and
determining an amount of background print agent to be applied to a region of the substrate corresponding to locations of the image portion and the void portion on the substrate when the image is printed;
wherein the amount of background print agent determined to be applied to a region of the substrate corresponding to the location of the void portion on the substrate when the image is printed is greater than the amount of a background print agent to be applied to the region of the substrate corresponding to the location of the image portion on the substrate when the image is printed.

2. The method of claim 1 wherein determining an amount of background print agent comprises determining an amount of background print agent to be printed in a region of the substrate corresponding the void portion when the image is printed in order to achieve a predetermined color parameter of the region of the substrate which, when the image is printed, corresponds to the void portion.

3. The method of claim 2 wherein determining an amount of background print agent comprises determining an amount of background print agent to be applied to a region of the substrate corresponding to the image portion when the image is printed to achieve a predetermined image parameter of the image portion when printed on the substrate.

4. The method of claim 2 wherein the background print agent is white and the predetermined color parameter comprises a predetermined lightness parameter.

5. The method of claim 1 comprising applying background print agent to the substrate in a series of layers until the determined amount of background print agent is built up.

6. The method of claim 5 wherein applying background print agent to the substrate comprises applying fewer layers of background print agent to a region of the substrate corresponding to the image portion than to a region of the substrate corresponding to the void portion.

7. The method of claim 5 wherein applying background print agent to the substrate comprises applying thinner layers of background print agent to a region of the substrate corresponding to the image portion than to a region of substrate corresponding to the void portion.

8. The method of claim 5 wherein applying background print agent to the substrate comprises:
applying a first layer of background print agent substantially uniformly across regions of the substrate corresponding to both the image portion and the void portion; and
applying a second layer of print agent over the first layer, wherein the second layer comprises background print agent in a region of the substrate corresponding to the location of the void portion and image print agent to print the image portion of the image.

9. The method of claim 8 wherein applying a second layer of print agent comprises applying the background print agent and the image print agent in a single printing pass.

10. The method of claim 9 further comprising, between applying the first layer and applying the second layer, applying a further layer of background print agent to the locations of the substrate corresponding to the void portion and drying a portion of the first layer corresponding to location of the image portion.

11. The method of claim 1 wherein the background print agent covers at least a substantial region of the substrate in a flood.

12. A printer comprising:
an interface to receive print data indicative of an image to be printed on a substrate, the print data indicating an image portion in which an image is present and a void portion in which the image is absent;
a print agent module to determine an amount of background print agent to be applied to a region of the substrate corresponding to locations of the image portion and the void portion on the substrate when the image is printed; and
a print head comprising at least one reservoir of print agent to apply the determined amount of background print agent to the substrate,
wherein the print agent module is to determine an amount of background print agent to be applied by the print head to a region of the substrate corresponding to the location of the void portion on the substrate when the image is printed which is greater than the amount of a background print agent to be applied to the location of the image portion of the substrate when the image is printed.

13. The printer of claim 12 in which the print agent module is to determine an amount of background print agent to be applied to a region of the substrate corresponding to the location of the void portion on the substrate when the image is printed to provide a predetermined color parameter, and to determine an amount of background print agent to be applied to a region of the substrate corresponding to the location of the image portion on the substrate to provide a predetermined image parameter.

14. The printer of claim 13 in which the predetermined color parameter is indicative of lightness and the predetermined image parameter is indicative of color vividness.

15. A non-transitory machine readable medium comprising instructions which, when executed by a processor, cause the processor to:

receive print data indicative of an image to be printed on a substrate, the print data indicating an image portion in which an image is present and a void portion in which the image is absent; and determine an amount of background print agent to be applied to a region of the substrate corresponding to locations of both the image portion and the void portion on the substrate when the image is printed;

wherein the amount of background print agent determined to be applied to a region of the substrate corresponding to the location of the void portion when the image is printed on the substrate is greater than the amount of a background print agent to be applied to the location of the image portion when the image is printed on the substrate.

* * * * *